(12) United States Patent
Alsaifi

(10) Patent No.: US 12,348,506 B2
(45) Date of Patent: *Jul. 1, 2025

(54) CERTIFICATION SYSTEM

(71) Applicant: Abdullah Rashid Alsaifi, Muscat (OM)

(72) Inventor: Abdullah Rashid Alsaifi, Muscat (OM)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,885

(22) Filed: Jun. 1, 2023

(65) Prior Publication Data

US 2023/0308431 A1    Sep. 28, 2023

Related U.S. Application Data

(63) Continuation of application No. 17/098,389, filed on Nov. 15, 2020, now Pat. No. 11,671,420, which is a continuation of application No. 15/644,787, filed on Jul. 9, 2017, now Pat. No. 10,841,294.

(51) Int. Cl.
*H04L 9/40* (2022.01)
*G06Q 30/018* (2023.01)

(52) U.S. Cl.
CPC ....... *H04L 63/0823* (2013.01); *G06Q 30/018* (2013.01); *H04L 63/0853* (2013.01)

(58) Field of Classification Search
CPC ........... G06Q 30/0635; G06Q 30/0643; G06Q 30/0641; G06Q 10/087; G06Q 10/063; G06Q 10/0833; G06Q 20/203; G06Q 10/08; H04W 4/35; G06F 3/0482

See application file for complete search history.

(56) References Cited

U.S. PATENT DOCUMENTS

| | | | | |
|---|---|---|---|---|
| 8,285,656 | B1 * | 10/2012 | Chang | H04L 51/23 706/45 |
| 8,321,302 | B2 * | 11/2012 | Bauer | H01Q 7/00 705/28 |
| 8,712,907 | B1 * | 4/2014 | Stibel | G06Q 40/03 705/38 |
| 9,569,729 | B1 * | 2/2017 | Oehrle | G06Q 10/063 |
| 9,754,277 | B2 * | 9/2017 | King | G06Q 20/405 |
| 9,836,772 | B1 * | 12/2017 | Rosenfeld | G06Q 10/083 |
| 10,319,053 | B1 * | 6/2019 | Kohli | G06Q 10/0832 |
| 10,614,495 | B2 * | 4/2020 | Busch | G06Q 50/18 |
| 2003/0014317 | A1 * | 1/2003 | Siegel | G06Q 30/06 705/28 |
| 2003/0018487 | A1 * | 1/2003 | Young | G06Q 30/0206 705/14.1 |
| 2003/0182180 | A1 * | 9/2003 | Zarrow | H05K 13/083 705/7.41 |
| 2006/0047546 | A1 * | 3/2006 | Taylor | G06Q 10/087 705/22 |

(Continued)

*Primary Examiner* — Tae K Kim

(57) ABSTRACT

An electronic communications method includes receiving, by a device, an electronic communication. The electronic communications method further includes analyzing, by the device, the electronic communications. The electronic communications method further includes generating, by the device, an electronic authentication certificate. The electronic communications method further includes sending a second electronic communication to another device that indicates that an electronic authentication certificate is generated for a particular electronic entity.

20 Claims, 13 Drawing Sheets

(56) References Cited

U.S. PATENT DOCUMENTS

| | | | |
|---|---|---|---|
| 2007/0005390 A1* | 1/2007 | Morgan | G06Q 50/10 705/317 |
| 2007/0162171 A1* | 7/2007 | McDonald | G06Q 10/0875 700/106 |
| 2007/0299715 A1* | 12/2007 | Brucato | G06Q 30/0201 705/7.29 |
| 2008/0071638 A1* | 3/2008 | Wanker | G06F 17/40 705/347 |
| 2008/0270209 A1* | 10/2008 | Mauseth | G06Q 30/0201 705/7.29 |
| 2009/0037244 A1* | 2/2009 | Pemberton | G06Q 10/087 705/28 |
| 2009/0089189 A1* | 4/2009 | Berry | G06Q 10/087 705/30 |
| 2009/0125350 A1* | 5/2009 | Lessing | G06Q 10/08 705/7.12 |
| 2009/0144070 A1* | 6/2009 | Psota | G06Q 30/0609 705/330 |
| 2009/0327006 A1* | 12/2009 | Hansan | G06Q 10/10 705/317 |
| 2010/0268660 A1* | 10/2010 | Ekdahl | G06Q 40/02 705/347 |
| 2012/0123673 A1* | 5/2012 | Perks | G06Q 30/0625 705/26.7 |
| 2013/0173430 A1* | 7/2013 | Benjamin | G06Q 30/0627 705/26.63 |
| 2013/0218463 A1* | 8/2013 | Howard | G06Q 30/0641 701/533 |
| 2014/0249947 A1* | 9/2014 | Hicks | G06Q 10/087 705/21 |
| 2014/0257918 A1* | 9/2014 | Spencer | G06Q 10/0635 705/7.28 |
| 2015/0073929 A1* | 3/2015 | Psota | G06Q 30/0201 705/26.2 |
| 2015/0112756 A1* | 4/2015 | Subramanian | G06Q 30/0201 705/7.29 |
| 2015/0127531 A1* | 5/2015 | Dimmler | G06Q 20/14 705/40 |
| 2015/0134407 A1* | 5/2015 | Celhar | G06Q 10/0637 705/7.29 |
| 2015/0242601 A1* | 8/2015 | Griffiths | H04L 63/105 726/5 |
| 2015/0363730 A1* | 12/2015 | Crane, Jr. | G06Q 10/087 705/7.25 |
| 2016/0019555 A1* | 1/2016 | Boles | G06F 9/4401 705/317 |
| 2016/0048938 A1* | 2/2016 | Jones | H04L 67/10 705/7.28 |
| 2016/0055504 A1* | 2/2016 | Murray | G06T 13/80 705/7.33 |
| 2016/0224933 A1* | 8/2016 | Miller | G06Q 10/087 |
| 2016/0224993 A1* | 8/2016 | Miller | G06F 16/24556 |
| 2016/0232540 A1* | 8/2016 | Gao | G06Q 30/0641 |
| 2016/0330231 A1* | 11/2016 | Gladstone | H04L 63/1433 |
| 2017/0186055 A1* | 6/2017 | Silkey | G06Q 30/0278 |
| 2017/0270472 A1* | 9/2017 | High | G06Q 10/087 |
| 2017/0351653 A1* | 12/2017 | Ramlet | G06Q 30/0245 |
| 2017/0372389 A1* | 12/2017 | Busch | G06Q 10/06395 |
| 2018/0083999 A1* | 3/2018 | Cherian | G06F 21/577 |
| 2018/0189691 A1* | 7/2018 | Oehrle | G06N 7/01 |

\* cited by examiner

| COMPANY NAME (602) | CERTIFICATION (604) | PRODUCT (606) | EXCHANGE SYSTEM (608) |
|---|---|---|---|
| COMPANY XYZ | FRANCE | CLOTHING | TOKEN 1 |
| COMPANY ABC | OMAN, JAPAN | ELECTRONICS | TOKEN 3 |
| COMPANY UWX | CHINA, USA | MOBILE PHONES | TOKEN 1, TOKEN 2 |
| ● | ● | ● | ● |
| ● | ● | ● | ● |

FIG. 6

| COMPANY (702) | PRODUCT (704) | EXCHANGE SYSTEM (706) | EVENT (708) |
|---|---|---|---|
| VALA188 | TELEVISION | TOKEN 1 | ELECTRO-WORLD |
| IGSI0085 | STEREO SYSTEMS | TOKEN 2 | SOUND EXPO |
| MAMU78 | VIDEO GAMES | TOKEN 1 | ELECTRO-WORLD |
| ● ● | ● ● | ● ● | ● ● |

CERTIFICATION SYSTEM

BACKGROUND

A number of online electronic entities are involved in various electronic transactions that allow for different users to interact with each other via one or more electronic transactions. However, there may be issues relating to whether one user can trust another user and expect the requirements of one or more electronic transactions to be fulfilled. Accordingly, an electronic platform may overcome these shortcomings and allow different users to be given a guarantee that the requirements of one or more electronic transactions to be fulfilled.

BRIEF DESCRIPTION OF DRAWINGS

FIG. 6 is an example database structure that stores electronic information about certified electronic entities;

FIG. 7 is an example database structure that stores electronic information about certified and non-certified electronic entities.

DETAILED DESCRIPTION OF PREFERRED EMBODIMENTS

The following detailed description refers to the accompanying drawings. The same reference numbers in different drawings may identify the same or similar elements.

Systems, devices, and/or methods described herein may allow for a user, using an electronic application implemented on a computing device (e.g., smartphone, laptop, etc.) that allows the user to interact with electronic entities that have been certified by a third-party wherein the user does not interact with the third-party. For example, an electronic entity may want to conduct electronic transactions over a communication channel (e.g., Internet, cellular network, etc.). To increase the number of electronic transactions, the online electronic entity may determine that it should be authenticated and certified by a third-party. In doing so, the online electronic entity may send electronic information to the third-party. Accordingly, the third-party may electronically analyze the electronic information and determine whether to authenticate the online electronic entity as a certified electronic entity.

In the event that the third-party determines to authenticate the electronic entity as a certified electronic entity, the information of the certified electronic entity may be stored in one or more servers.

By becoming authenticated by the third-party, the one or more servers may be associated with an electronic application that allows for a user to search for certified electronic entities. In embodiments, the electronic application may include an electronic search engine feature that allows for a user to find certified electronic entities that have particular characteristics. Furthermore, non-certified electronic entities may become electronically associated with the certified electronic entity and can also be searched within the electronic application. Additionally, the electronic application may also find one or more periods of time in a particular geographic area that are associated with the non-electronic entities.

Accordingly, the electronic application may provide one or more electronic processes that (1) determines an electronic authentication process to certify an electronic entity, (2) interacts with one or more servers that electronically stores information about certified electronic entities, and (3) provides search capabilities to electronically find one or more certified electronic entities and associated non-certified electronic entities.

Figure 1A:
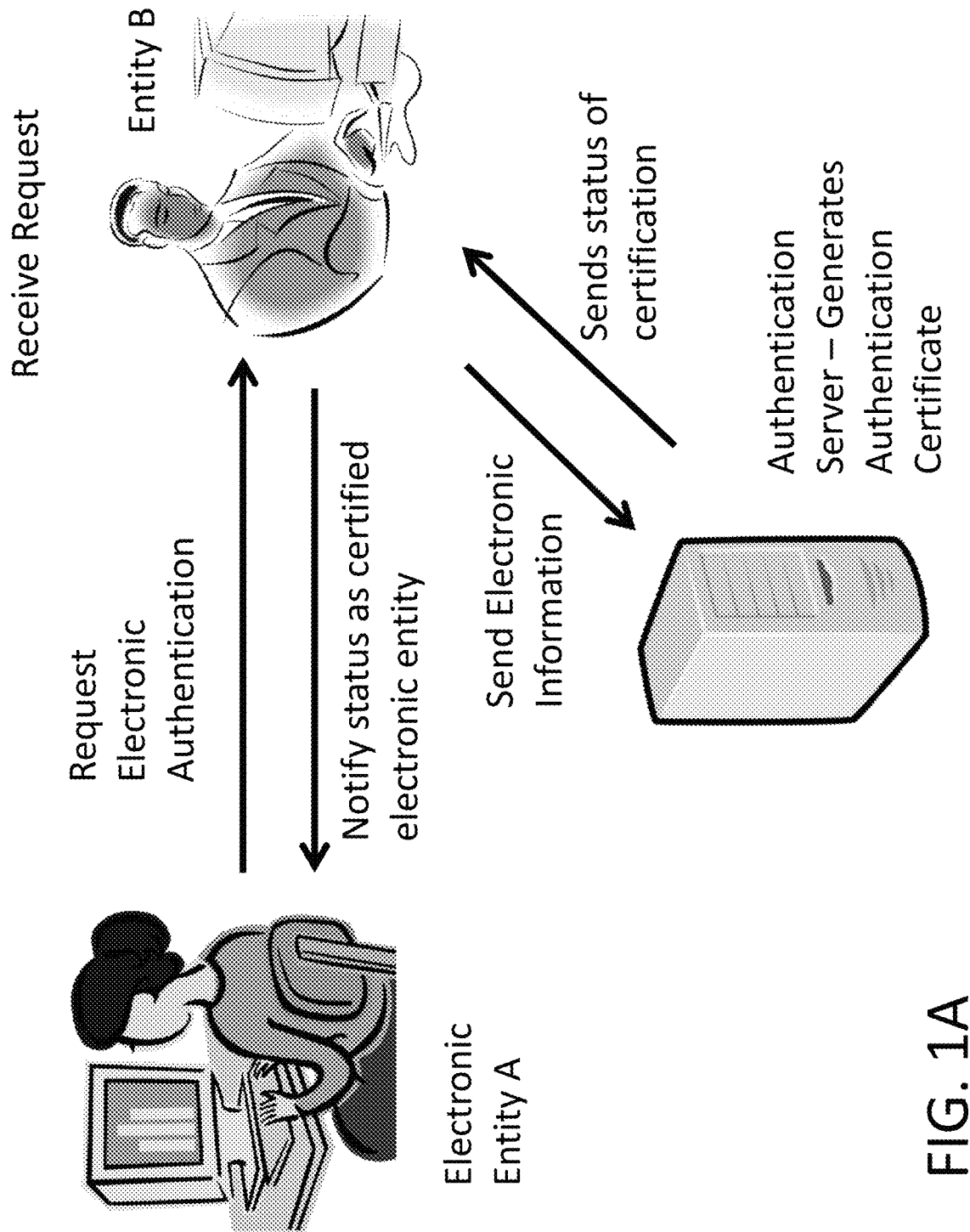
FIGS. 1A-1C is a diagram of an example environment in which systems and/or methods described herein may be implemented.
Figure 1B:
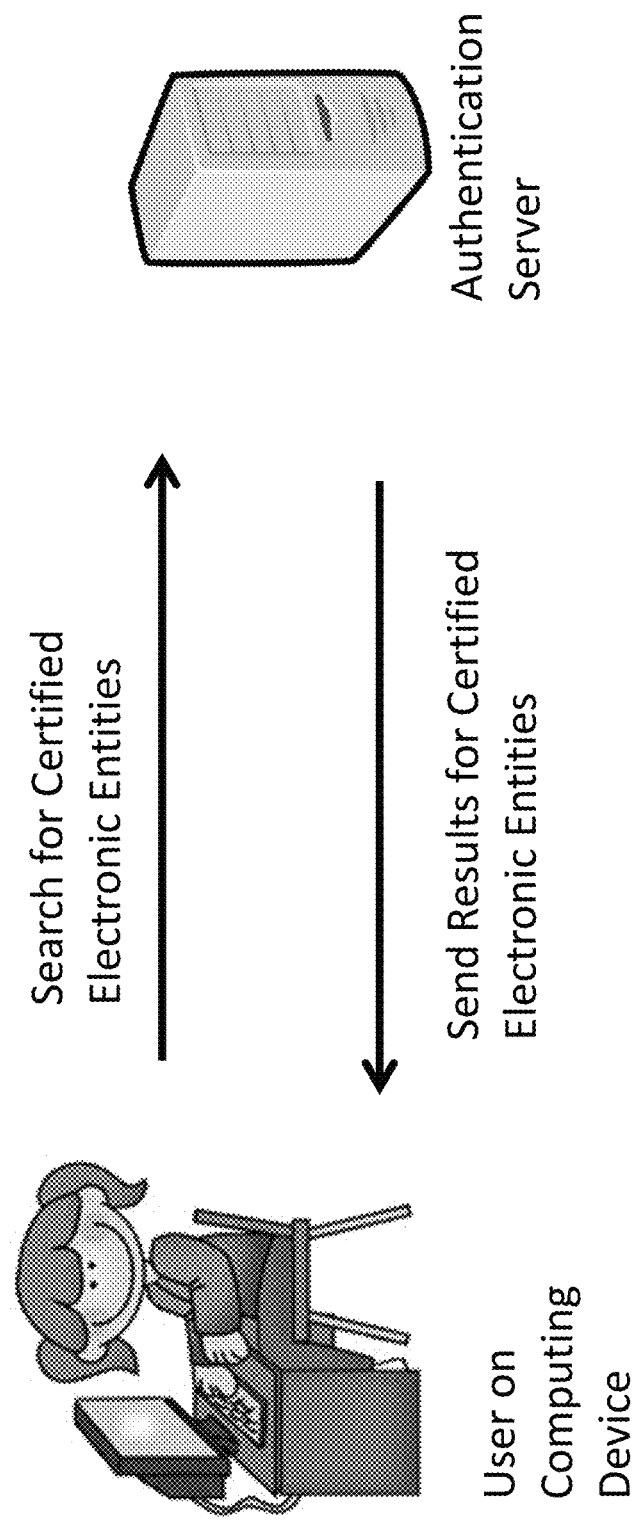
Figure 1C:
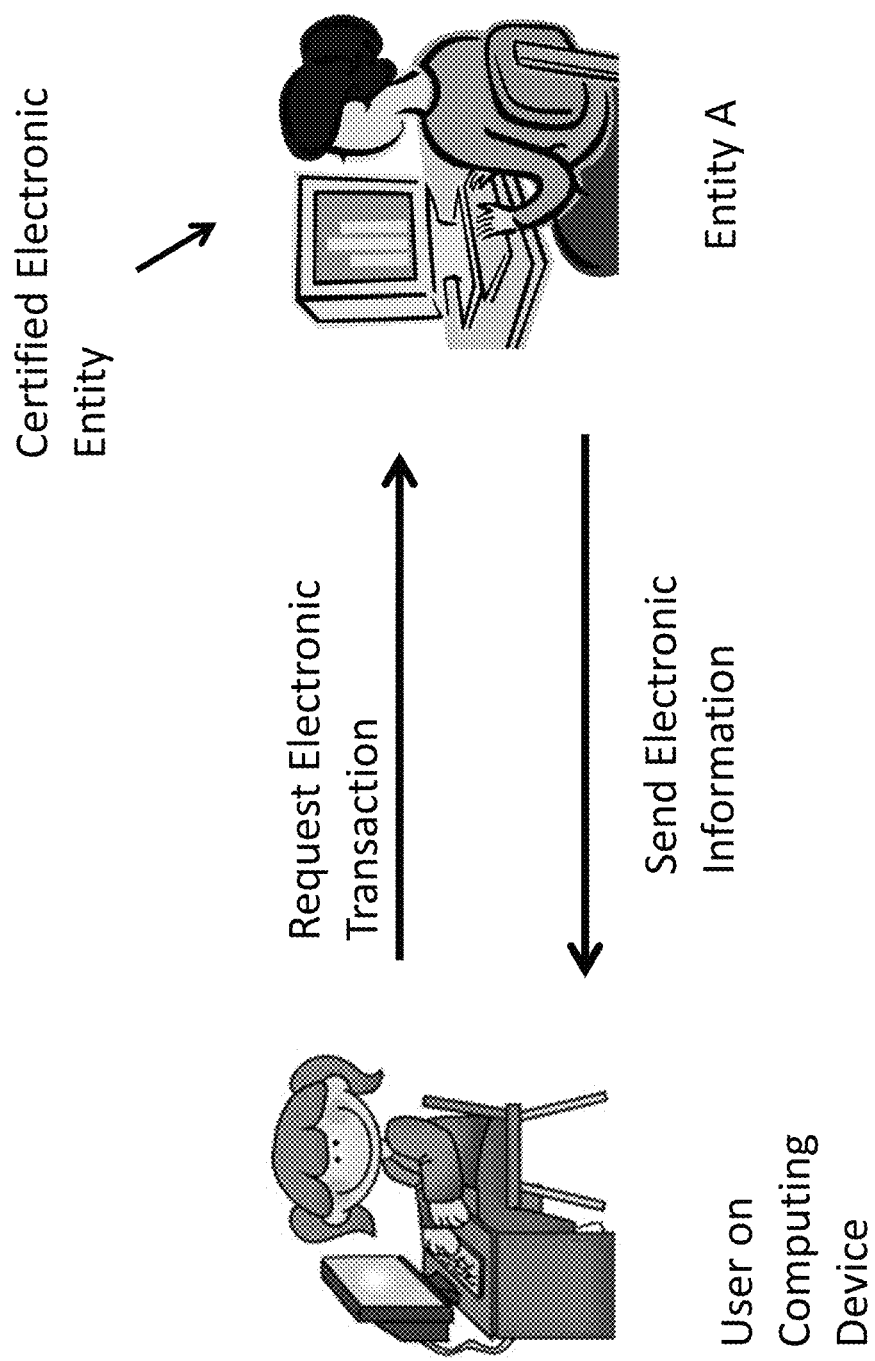

FIGS. 1A-1C describe an example process of certifying electronic entities, searching for certified electronic entities, and electronically transacting with a certified electronic entity.

FIG. 1A shows an example process of certifying an electronic entity. As shown in FIG. 1A, a user, associated with electronic entity A, requests electronic authentication from electronic entity B. In embodiments, as will be described in further figures, electronic entity A may send information about the electronic entity that may include a name, geographic location, and other information. In embodiments, electronic entity B may receive the electronic information and use an electronic application to interact with an authentication server that processes the electronic information and automatically determine whether to authenticate electronic entity A. In this particular example, the authentication server may authenticate electronic entity A and store the electronic authentication certificate, for electronic entity A, in an authentication server. Furthermore, the authentication server may send a notification to electronic entity B, via the electronic application, that certification occurs and electronic entity B may send an electronic message to electronic entity A that it is now a certified electronic entity. In embodiments, electronic entity B may further limit the certification of electronic entity A based on the types of services and/or products offered by electronic entity A. For example, electronic entity A may sell mattresses and may only be authenticated and certified to offer bedding products similar to mattresses and not other types of products, such as televisions or cars.

FIG. 1B shows an example process of searching for a certified electronic entity. As shown in FIG. 1B, a user may decide to search for a certified electronic entity by using the electronic application. In doing so, the user may use a computing device (e.g., a laptop, desktop computer, etc.) to electronically communicate, via the electronic application, with the authentication server as described in FIG. 1A. In embodiments, the user may enter electronic search information and the authentication server may send electronic information that provides search results based on the information received by the authentication server.

FIG. 1C shows an example process of electronically transacting with a certified electronic entity. As shown in FIG. 1C, the user (described in FIG. 1B) decides to interact with the entity A, via a computing device, which was designated as a certified electronic entity from the search results described in FIG. 1B. As further shown in FIG. 1C, the user requests an electronic transaction with electronic entity A and electronic entity A sends electronic information confirming an electronic transaction. Accordingly, the user can be provided a near or exactly 100% probability that the electronic transaction and associated transactions will occur.

As such, a user never electronically interacts with entity B that generated, via the electronic application, or outside the electronic application, the authentication certificate and only interacts with electronic entity A. Thus, a user reduces the number of electronic transactions, the amount of computing resources (e.g., computer memory, processing power, etc.), and the amount of time and cost to determine that the probability of a successful electronic transaction and related successful transactions will be near to or 100%. Instead, a user can use an electronic application that searches for certified electronic entities (that have an electronic authentication certificate) and is able to electronically transact with one or more of those certified electronic entities with a near to or 100% probability that the result of the electronic communications and/or transactions will occur.

Figure 2:
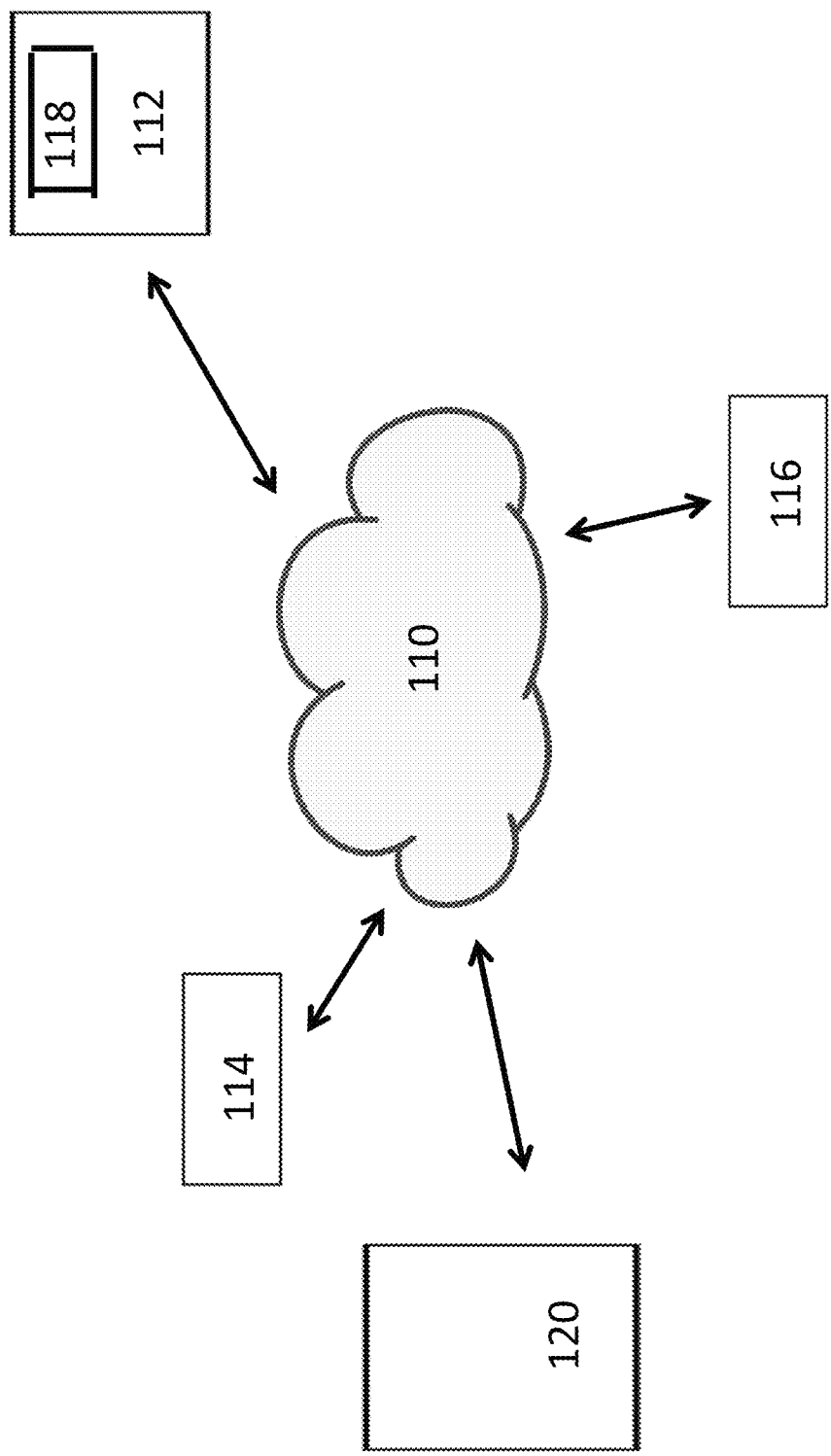
FIG. 2 is a diagram of a network environment; an example computing device.

FIG. 2 is a diagram of example environment 100 in which systems, devices, and/or methods described herein may be implemented. FIG. 1 shows network 110, user device 112, user device 114, user device 116, electronic application 118, and authentication server 120.

Network 110 may include a local area network (LAN), wide area network (WAN), a metropolitan network (MAN), a telephone network (e.g., the Public Switched Telephone Network (PSTN)), a Wireless Local Area Networking (WLAN), a WiFi, a hotspot, a Light fidelity (LiFi), a Worldwide Interoperability for Microware Access (WiMax), an ad hoc network, an intranet, the Internet, a satellite network, a GPS network, a fiber optic-based network, and/or combination of these or other types of networks. Additionally, or alternatively, network 110 may include a cellular network, a public land mobile network (PLMN), a second generation (2G) network, a third generation (3G) network, a fourth generation (4G) network, a fifth generation (5G) network, and/or another network. In embodiments, network 110 may allow for devices describe in FIGS. 1 and 2 to electronically communicate (e.g., using emails, electronic signals, URL links, web links, electronic bits, fiber optic signals, wireless signals, wired signals, etc.) with each other so as to send and receive various types of electronic communications.

User device 112, 114, and/or 116 may include any computation or communications device that is capable of communicating with a network (e.g., network 110). For example, user device 112, user device 114, or user device 116 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a desktop computer, a laptop computer, a tablet computer, a camera, a personal gaming system, a television, a set top box, a digital video recorder (DVR), a digital audio recorder (DUR), a digital watch, a digital glass, or another type of computation or communications device.

User device 112, 114, and/or 116 may receive and/or display content. The content may include objects, data, images, audio, video, text, files, and/or links to files accessible via one or more networks. Content may include a media stream, which may refer to a stream of content that includes video content (e.g., a video stream), audio content (e.g., an audio stream), and/or textual content (e.g., a textual stream). In embodiments, an electronic application may use an electronic graphical user interface to display content and/or information via user device 112, 114, and/or 116. User device 112, 114, and/or 116 may have a touch screen and/or a keyboard that allows a user to electronically interact with an electronic application. In embodiments, a user may swipe, press, or touch user device 112, 114, and/or 116 in such a manner that one or more electronic actions will be initiated by user device 112, 114, and/or 116 via an electronic application.

User device 112, 114, and/or 116 may include a variety of applications, such as, for example, an e-mail application, a telephone application, a camera application, a video application, a multi-media application, a music player application, a visual voice mail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.).

Electronic application 118 may be capable of interacting with authentication server 120, user device 112, 114, and/or 116 to automatically and electronically analyze electronic information and determine whether to electronically generate an electronic certification of an electronic entity. In embodiments, additional electronic certifications may be generated for particular products and/or services provided by the electronic entity and not for the entire electronic entity. In embodiments, once electronic application 118 has generated an electronic certification, electronic application may interact with authentication server 120 and store electronic information about the electronic certificate. In embodiments, electronic application 118 may be used to search for electronic entities with an electronic certificate—a certified electronic entity. In embodiments, electronic application 118 may be electronically configured and designed by using a computing device, such as user device 112, 114, or 116. In embodiments, electronic application 118 may interact with application programming interfaces (APIs) to obtain electronic information from other electronic applications. In embodiments, electronic application 118 may be electronically configured to show photos, video, text, icons, graphical images, buttons, emojis, and/or any other electronic information. While FIG. 2 shows electronic application 118 on user device 112, electronic application 118 can also be stored by user device 112, 114, 116, and/or authentication server 120.

Authentication server 120 may include one or more computational or communication devices that gather, process, store, and/or provide information relating to one or more web pages or electronic pages associated with electronic application 126 that is searchable and viewable over network 110. While FIG. 2 shows an authentication server 120 there may be additional authentication servers 120 associated with one or more electronic applications 118.

While FIG. 2 shows electronic application 118, there may be multiple different types of electronic applications 118 that each has their own server(s) that are similar to server 120.

Figure 3:
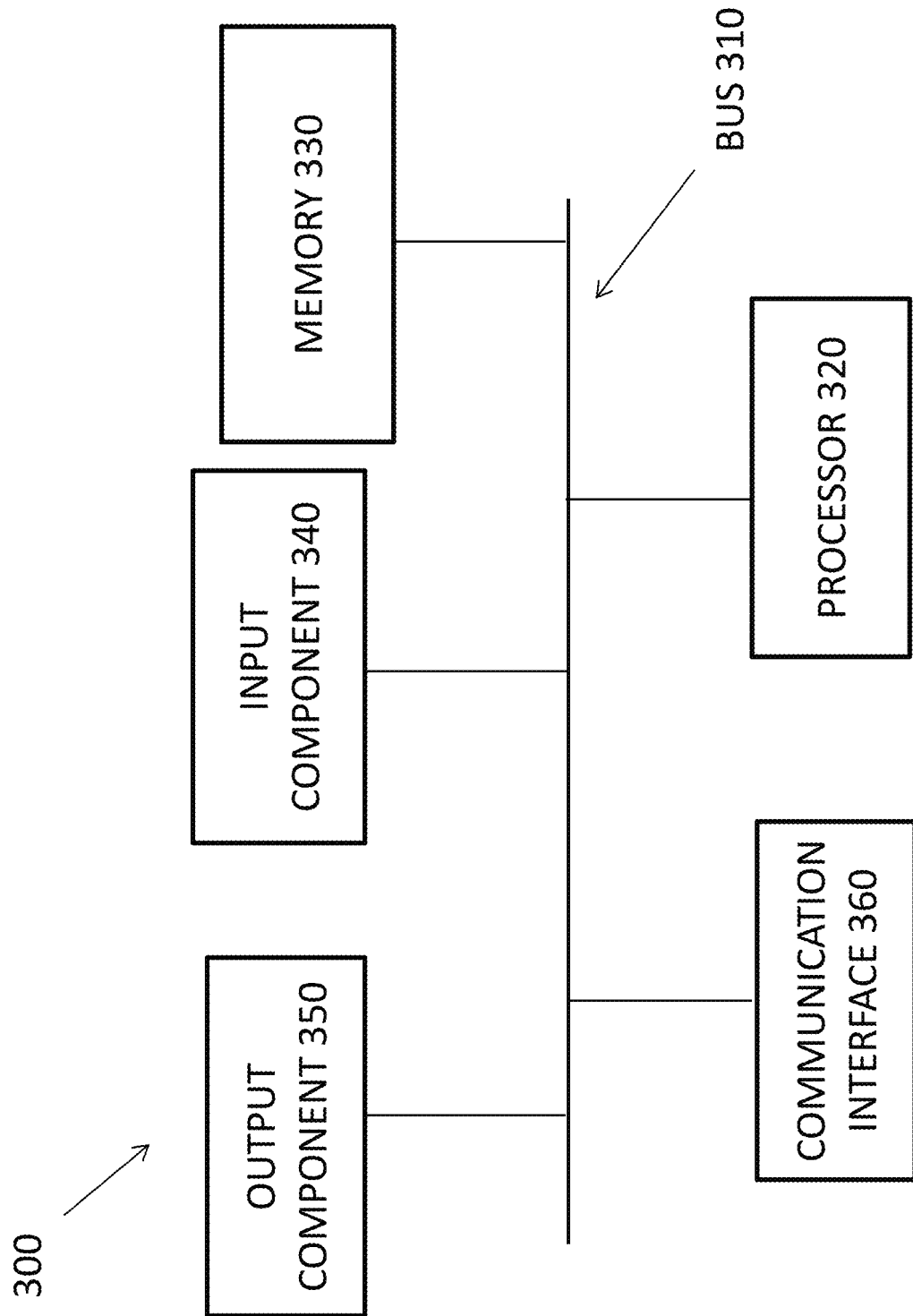
FIG. 3 is a diagram of an example computing device.

FIG. 3 is a diagram of example components of a device 300. Device 300 may correspond to user device 112, 114, 116, and authentication server 120. Alternatively, or additionally, user device 112, 114, 116, and authentication server 120 may include one or more devices 300 and/or one or more components of device 300.

As shown in FIG. 3, device 300 may include a bus 310, a processor 320, a memory 330, an input component 340, an output component 350, and a communications interface 360. In other implementations, device 300 may contain fewer components, additional components, different components, or differently arranged components than depicted in FIG. 3.

Additionally, or alternatively, one or more components of device 300 may perform one or more tasks described as being performed by one or more other components of device 300.

Bus 310 may include a path that permits communications among the components of device 300. Processor 320 may include one or more processors, microprocessors, or processing logic (e.g., a field programmable gate array (FPGA) or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320. Input component 340 may include a mechanism that permits a user to input information to device 300, such as a keyboard, a keypad, a button, a switch, voice command, etc. Output component 350 may include a mechanism that outputs information to the user, such as a display, a speaker, one or more light emitting diodes (LEDs), etc.

Communications interface 360 may include any transceiver-like mechanism that enables device 300 to communicate with other devices and/or systems. For example, communications interface 360 may include an Ethernet interface, an optical interface, a coaxial interface, a wireless interface, or the like.

In another implementation, communications interface 360 may include, for example, a transmitter that may convert baseband signals from processor 320 to radio frequency (RF) signals and/or a receiver that may convert RF signals to baseband signals. Alternatively, communications interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communications interface 360 and transmit the RF signals over the air, and receive RF signals over the air and provide the RF signals to communications interface 360. In one implementation, for example, communications interface 360 may communicate with network 110.

As will be described in detail below, device 300 may perform certain operations. Device 300 may perform these operations in response to processor 320 executing software instructions (e.g., computer program(s)) contained in a computer-readable medium, such as memory 230, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 2330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
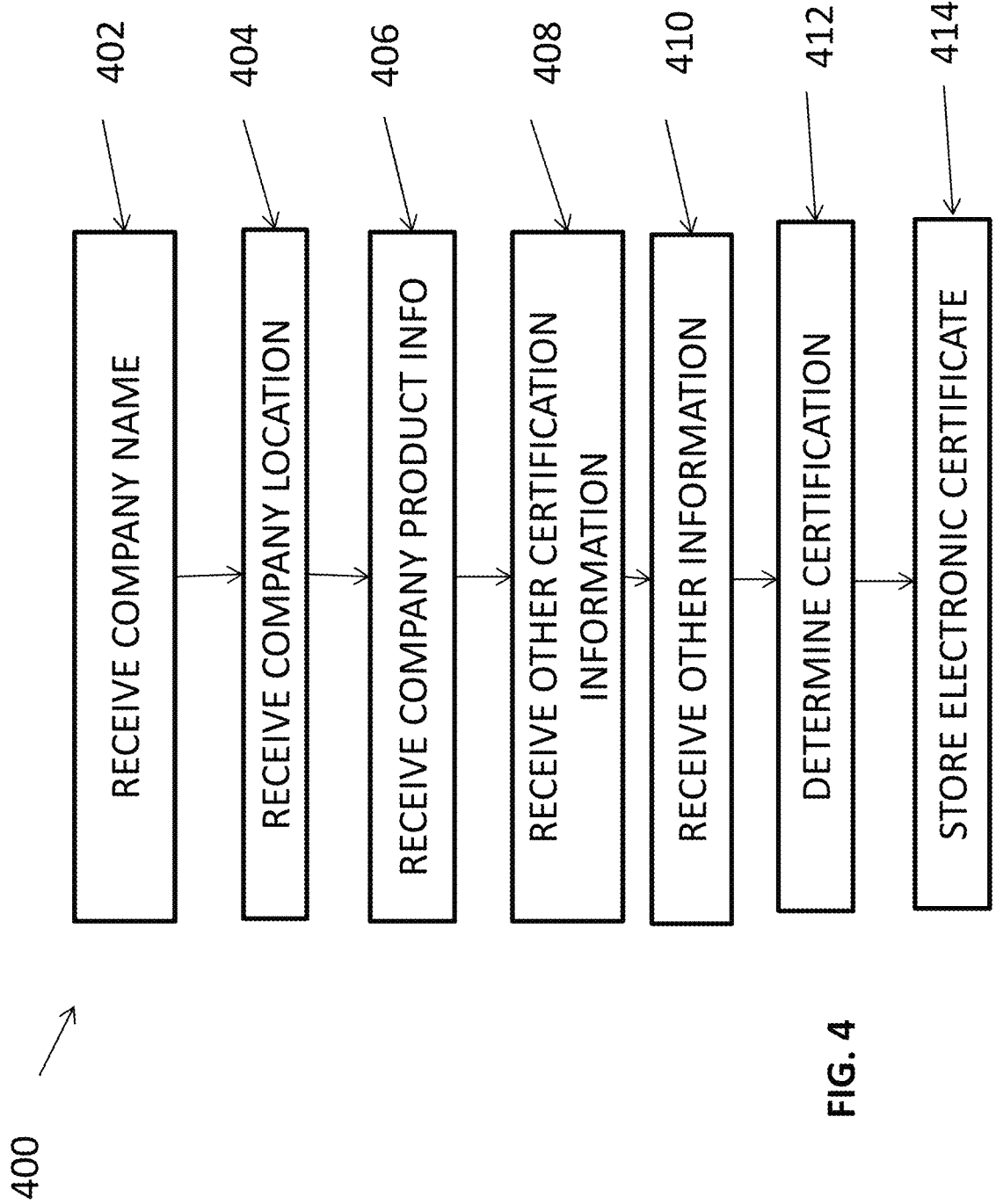
FIG. 4 is a flow chart of an example process for authenticating information.

FIG. 4 is a flow chart of an example process 400 for generating an electronic certificate. In embodiments, example process 400 may be performed by authentication server 120 receiving electronic information from user devices 112, 114, and/or 116, via electronic application 118, as described in FIG. 1. In embodiments, any electronic certification determined by FIG. 4 may be re-analyzed for re-certification on a real-time basis (e.g., based on continuous electronic transaction information based on new electronic communications or transaction success rates) or may be re-analyzed after a particular period of time.

At step 402, authentication server 120 may receive electronic information about a name for an electronic entity. In embodiments, authentication server 120 may receive the electronic information from a computing device associated with the electronic entity. In embodiments, authentication server 120 may interact with other servers, via network 110, and determine whether the name of the electronic entity exists. For example, authentication server 120 may receive electronic information that includes the name "ABC Electronics." Accordingly, authentication server 120 may send one or more electronic communications to other servers and receive information about "ABC Electronics." In embodiments, the electronic information may include email information and/or other types of contact information (e.g., phone number, mobile number, etc.).

At step 404, authentication server 120 may receive electronic information about a geographic location for an electronic entity. In embodiments, authentication server 120 may receive the electronic information from a computing device associated with the electronic entity. In embodiments, authentication server 120 may electronically communicate with other computing devices and/or servers to obtain electronic information that matches the electronic entity's name and geographic location.

At step 406, authentication server 120 may receive electronic information about products and/or services that are sold by the electronic entity. In embodiments, the electronic entity may be associated with an entity that has physical locations in one or more countries around the world. In embodiments, authentication server 120 may communicate with other computing devices and/or servers associated with the electronic entity to receive electronic information about the real-time available products and services available in the electronic entity. In embodiments, authentication server 120 may receive the electronic information from a computing device associated with the electronic entity. In embodiments, authentication server 120 may electronically communicate with other computing devices and/or servers to obtain electronic information that matches the entity's name, geographic location, and the products and/or services sold by the electronic entity.

At step 408, authentication server 120 may receive electronic information about any other certifications associated with the electronic entity. In embodiments, authentication server 120 may receive the electronic information from a computing device associated with the electronic entity. In embodiments, authentication server 120 may electronically communicate with other computing devices and/or servers to obtain electronic information that matches the other certification associated with the electronic entity with one or more electronic information received in steps 402, 404, and/or 406. In embodiments, the electronic information about the other certifications associated with the electronic entity may include alphabetical and numerical information and information about a governmental institution. In embodiments, the electronic information may include a segment of time that the certificate is valid, renewal information for the other certifications, and information about a grace period associated with renewing the other certificates. In embodiments, this particular electronic certification information may indicate to a customer the expiration of the validity of an electronic certification and when the electronic entity can no longer perform electronic transactions.

At step 410, authentication server 120 may receive other electronic information about the electronic entity from electronic entities other than the electronic entity requesting authentication and certification. In embodiments, authentication server 210 may electronically communicate with electronic entities to obtain electronic information that includes reviews, complaints, pending lawsuits, governmental investigations, product recalls, settled lawsuits, on-time shipping statistics, number of employees, the names of registered employees, number of contractors, and/or any other information that has resulted in users becoming harmed, financially or physically, in their interactions with the electronic entity requesting authentication and certification. In embodiments, the information regarding registered employees will assist other organizations in preventing human trafficking, use of underage workers, and other types of slavery. In embodiments, the electronic entity requesting certification (e.g., a governmental entity). may use the stored information to determine more effectively (e.g., using less computing resources, electronic communications, etc.) to fulfill various laws relating to employment, taxation, immigration, and education so that the economic output of a particular region (e.g., a city, a province, an entire country, etc.) can be increased. In embodiments, the electronic information may also be used to allocate different taxation rates for different electronic entities based on product and/or service offering, size of the electronic entity, etc.

At step 412, authentication server 120 may determine whether to generate an electronic certification and certify the electronic entity. In embodiments, authentication server 120 may use one or electronic processes to determine the electronic certification. In embodiments, authentication server 120 may generate different levels of certification. For example, the lowest level of certification may determine that an electronic entity does exist and is located in a particular geographic location. Another level of certification may indicate that an electronic entity has no complaints or any past or current lawsuits against the electronic entity in addition to authentication of the electronic entity's name and geographic location. An additional level of certification may indicate that an electronic entity has positive reviews in addition to having no complaints (or a certain threshold level of complaints), no past or current lawsuits against the electronic entity in addition to authentication of the electronic entity's name and geographic location. Accordingly, electronic communications with a score is determined that is greater or lower than a particular threshold. In embodiments, the certification may be based on a geographic location of the electronic entity. For example, the certification may only be provided if the electronic entity has a particular number of physical locations within one or more different geographic locations. For example, if the electronic entity has no physical locations (e.g., a building), than a different certification may be provided than an electronic entity that has physical locations. Accordingly, an electronic score may be generated based on the number of physical locations. In embodiments, the certification may only be for a particular type of electronic transaction with the electronic entity. For example, the certification may only be for electronic transactions below or greater than a particular threshold value. Additionally, or alternatively, the certification may only be for particular types of products or services electronically (or physically) sold by the electronic entity. For example, the electronic entity may distribute appliances and computers and is only certified for appliances. In embodiments, the electronic certification may also have different level based on the time that the electronic entity has been in existence. In embodiments, the certification may be based on one or more values that are generated from scores based on product, geographic locations, electronic comments, shipping success rates, customer satisfaction, and/or any other information. In embodiments, the one or more values may be lower or greater than a threshold to result in electronic authentication.

In embodiments, authentication server 120 may determine not to provide an electronic certificate for the electronic entity and, as such, not provide an indication that the electronic entity is a certified electronic entity. In embodiments, authentication server 120 may determine that one or more types of electronic information are associated with an electronic score that is greater than a threshold level that indicates that the electronic entity cannot provide near to or 100% probability of providing a product or service via one or more electronic transactions. Alternatively, authentication server 120 may determine that one or more types of electronic information are associated with an electronic score that is lower than a threshold level that indicates that the electronic entity cannot provide near to or 100% probability of providing a product or service via one or more electronic transactions.

At step 414, authentication server 120 may store the electronic certificate. In embodiments, the electronic certificate may be valid for a limited amount of time or may be valid for an unlimited amount of time. In embodiments, when an electronic search is performed (as described in FIG. 5) for a certified electronic entity, via electronic application 118, authentication server 120 may receive the search request and send an electronic communication that includes the electronic certificate. Alternatively, when an electronic search is performed (as described in FIG. 5) for a certified electronic entity, via electronic application 118, authentication server 120 may receive the search request and send an electronic communication that indicates that the electronic entity is not certified. In embodiments, authentication server 120 may send electronic information associated with an electronic certificate for display on a computing device. The electronic certificate may be graphic, a Quick Response (QR) code, or any other electronic format that can be selected by a user using a user device or computing device. In alternate embodiments, authentication server 120 may be accessed via a computing device and the electronic certification can be converted to a paper format and can be displayed by a company or person in a physical location. In embodiments, the electronic certificate may include information about the certifying entity, period of validity of the certificate, geographic locations, number of employees, and/or any other information.

Figure 5:
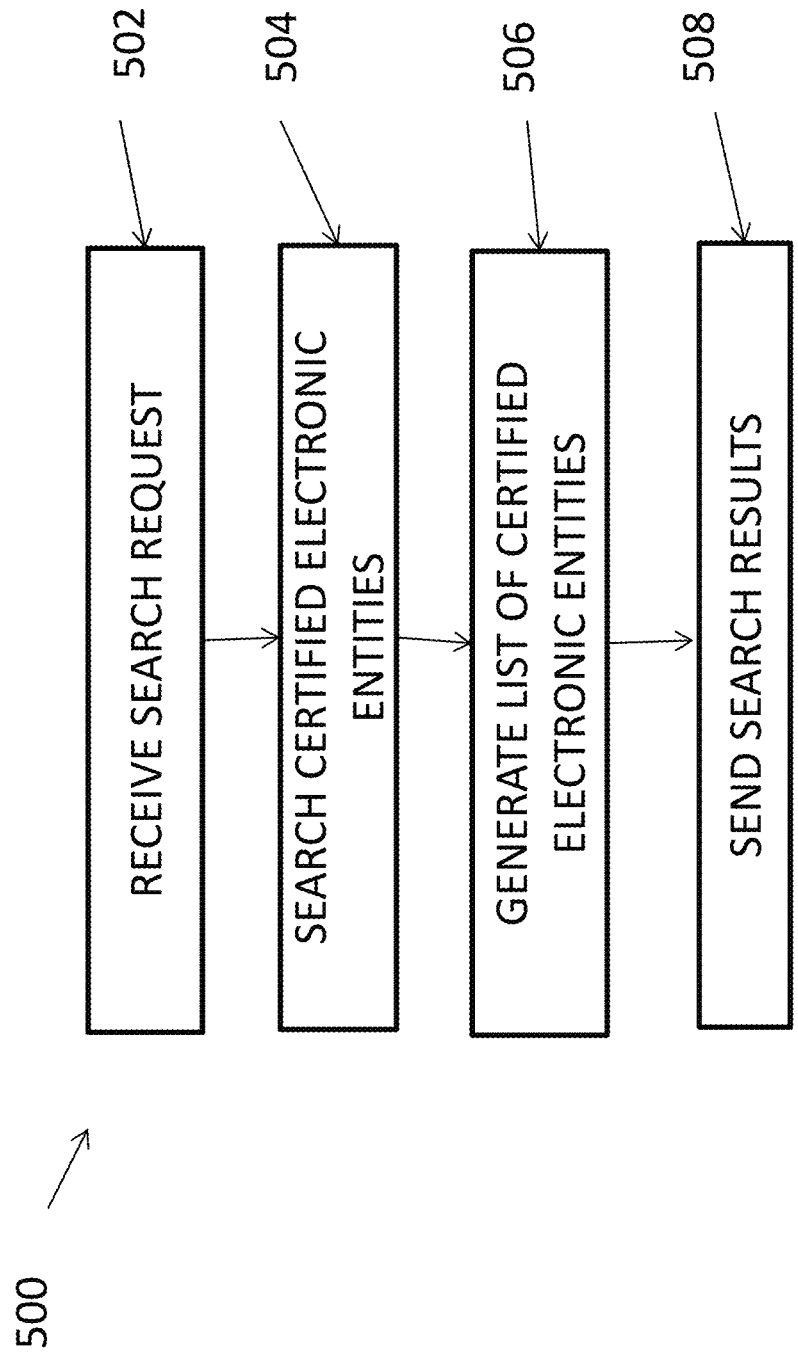
FIG. 5 is a flow chart of an example process for searching for certified electronic entities.

FIG. 5 is a flow chart of an example process 500 for processing an electronic search for certified electronic entities. In embodiments, example process 500 may be performed by authentication server 120 receiving electronic information from user devices 112, 114, and/or 116, via electronic application 118, as described in FIG. 1.

At step 502, authentication server 120 may receive an electronic search request for a certified electronic entity. In embodiments, authentication server 120 may receive the electronic search request via electronic application 118. At step 504, authentication server 120 may electronically search one or more electronic databases (e.g., such as FIGS. 6 and 7) for certified electronic entities that match the information in the electronic search request. At step 506, authentication server 120 may generate an electronic list of certified electronic entities. At step 508, authentication server 120 may send the electronic list of certified electronic entities for electronic display on a computing device via electronic application 118.

FIG. 6 describes an example data structure 600 that stores authentication information associated with electronic application 118. In embodiments, data structure 600 may include a collection of fields such as Company Name 602, Certifying Entity 604, Product 606, and Exchange System 608. Although FIG. 6 shows example fields 602-608, in other embodiments, data structure 600 may include fewer fields, different fields, additional fields, and/or differently arranged fields than depicted in FIG. 6. In embodiments, authentication server 120 may store some or all of data structure 600. Additionally, or alternatively, user device 112, 114, and/or 116 may store some or all of data structure 600.

In embodiments, Company Name 602 may store an identifier for a certified electronic entity. Company Name 602 may include one or more alphanumeric symbols (e.g., letters, numbers) and/or other types of symbols. In embodiments, Company Name 602 may include an owner's name, or other associated contact information. In embodiments, the location of the certified electronic entity may also be provided and may be used to electronically search for any physical location associated with Company Name 602 the certified electronic entity. In embodiments, Certifying Entity 604 may store electronic information about which certifying entities have used authentication server 120 to certify the electronic entity. In embodiments, Product 606 may store electronic information about products or services that may be obtained from the electronic entity by using one or more electronic communications. In embodiments, the price and product information may be in real-time and may be automatically updated based on API's or other interfaces between authentication server 120 and other servers that store price and product information. In embodiments, Exchange System 608 may store electronic information about electronic tokens that may be used to purchase products and/or services from the certified electronic entity. For example, as shown in FIG. 6, Company XYZ may use Token 1 which may be an electronic token that is only valid in particular or all geographic locations. While not shown in FIG. 6, there be additional data fields, such as a data field indicating the number of employees associated with a particular company name.

FIG. 7 describes an example data structure 700 that stores non-certified entity information associated with a particular certified electronic entity. In embodiments, data structure 700 may include a collection of fields such as Company Name 702, Product 704, Exchange System 706, and Event 708. Although FIG. 7 shows example fields 702-708, in other embodiments, data structure 700 may include fewer fields, different fields, additional fields, and/or differently arranged fields than depicted in FIG. 7. In embodiments, authentication server 120 may store some or all of data structure 700. Additionally, or alternatively, user device 112, 114, and/or 116 may store some or all of data structure 700.

In embodiments, Company Name 702 may store electronic information about a non-certified electronic entity that is associated with a certified electronic entity. For example, a certified electronic entity could be Company XYZ (as shown in FIG. 6) and the names as shown in Company Name 702 may be all the non-certified electronic entity, such as VALA188, that is associated with Company XYZ. In embodiments, Company Name 702 may store a person's name who is not incorporated but provides services and/or products. In embodiments, Product 704 may store electronic information about products and/or services sold by the certified electronic entity. In embodiments, Product 704 may also include price information about the products and/or services offered. In embodiments, the price and product information may be in real-time and/or automatically be updated based on API's or other interfaces between authentication server 120 and other servers that store price and product information. In embodiments, Product 704 may also be used to determine which products and/or services an electronic entity (as described in Company Name 702) may be certified. In embodiments, Products 704 may include an entry "ALL" which allows all products and/or services electronically or physically offered by the company to be certified and authenticated. In embodiments, Exchange System 706 may store electronic information about electronic tokens that may be used to purchase products and/or services from the certified electronic entity. For example, as shown in FIG. 7, IGSI0085 may use Token 2 which may be an electronic token that is only valid in particular or all geographic locations. In embodiments, the electronic token may have a particular value that can be exchanged for goods, bit-coins and/or any form currency or can be stored for future exchange for goods and/or services. In embodiments, the electronic token can be stored in memory as bits and/or bytes. In embodiments, electronic transactions associated with one or more electronic tokens may be stored in a different computing device or within a different database within the authentication server. In embodiments, Event 708 may associate a particular event (electronic or in the non-electronic world) with a non-certified electronic entity and/or a certified electronic entity. In embodiments, the event may be an exposition or conference or may be another electronic platform that promotes the non-certified electronic entity. As discussed in later figures, a user using electronic application 118 may be able to electronically search for events that include one or more non-certified electronic entities associated with a particular certified electronic entity.

FIGS. 8-11 are diagrams of example processes for using an electronic application for generating an electronic communications and to send an electronic invite associated with an event, providing authentication login information associated with another electronic application, participating in an event, generating an electronic list, and electronically interacting with different electronic profiles listed on the electronic list. In embodiments, the example process described in the following figures may use one or more of the devices, networks, and electronic applications described in FIGS. 2 and 3. Furthermore, in embodiments, the example processes described in the following figures may have one or more features described in the flowcharts and/or data structure described in FIGS. 4 and 5. In embodiments, interactions with the electronic application may require a user to log into the electronic application by using a special password or special identifier (e.g., social security number).

Figure 8:
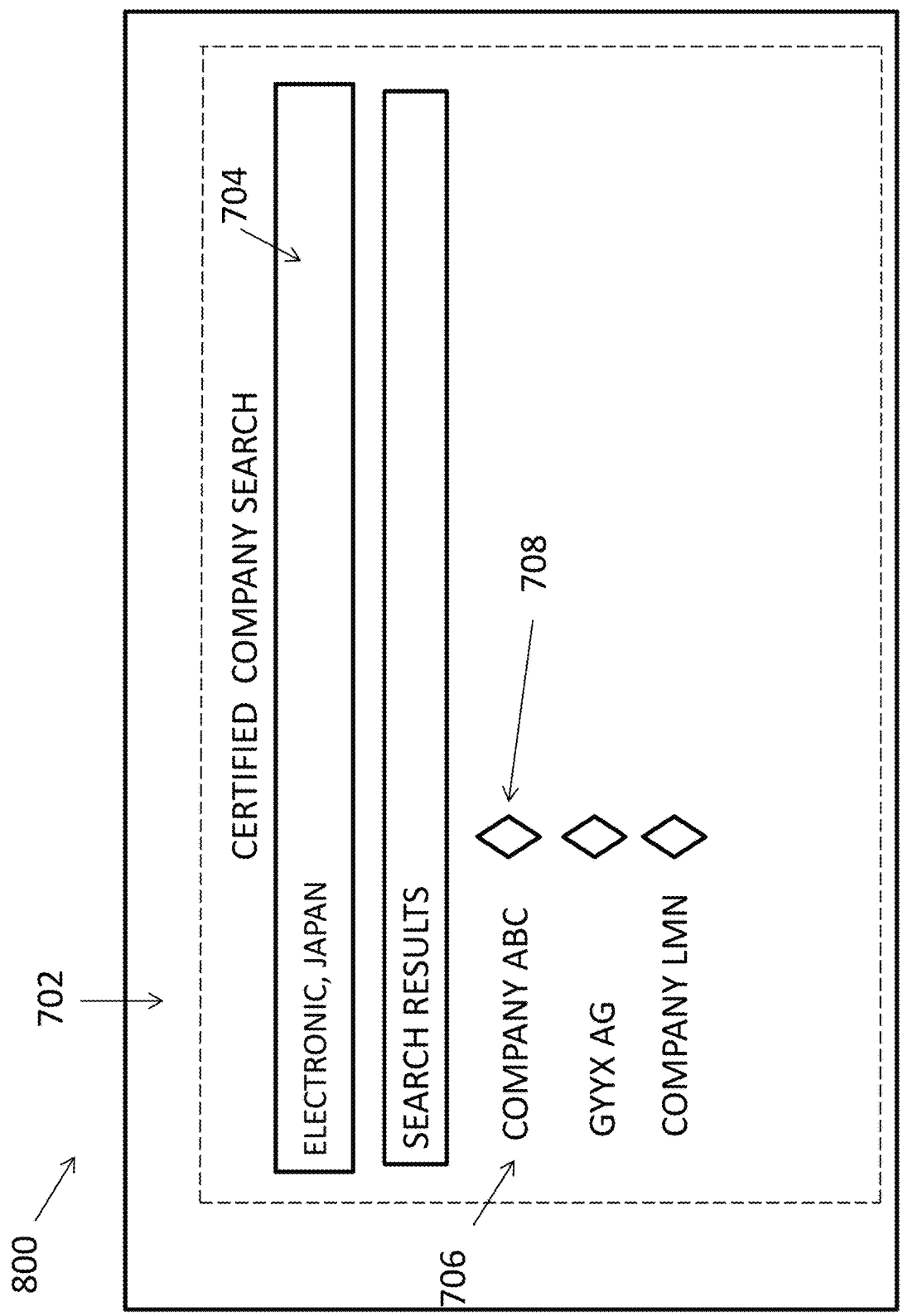
FIGS. 8-11 are example diagrams for an electronic platform for searching and electronically communicating with certified electronic entities.

FIG. 8 shows a screen shot 800 (on a user device 112, 114, or 116) of electronic application 702 which is similar to electronic application 118, as described in FIG. 1. In embodiments, a user of a user device may decide to use electronic application 702 that allows the user to search for a certified electronic entity. In FIG. 8, for example, John has decided to search for an electronic entity that sells electronics and is geographically located in Japan. As shown in FIG. 8, John enters "Electronic, Japan" into area 704. In embodiments, the search term may include only the product and/or service, or just include a geographic location. Upon using the user device to initiate (e.g., via a keyboard, mouse, touchscreen, voice command) a search, electronic application 702 will display results. As shown in FIG. 8, results 706 include three companies that have been authenticated and certified by an authentication server (e.g., authentication server 120). As shown in FIG. 8, the three companies are "Company ABC," "GYYX AG," and "Company LMN." While FIG. 8 shows three results, a search result may provide fewer or a greater number of certified electronic entities.

Figure 9:
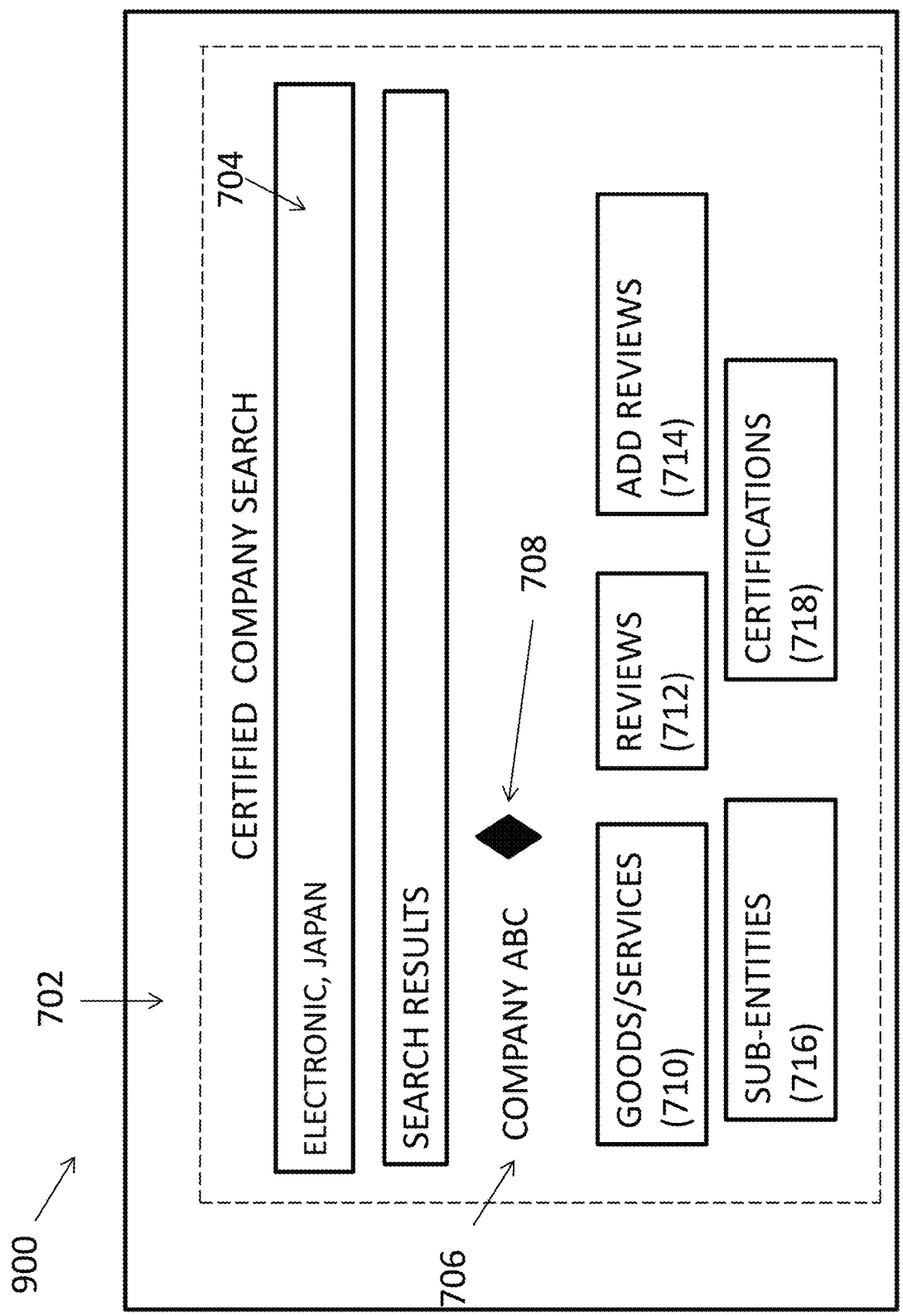

As shown in FIG. 8, the user may select one or more of icons 708 (and/or hyperlinks) to see additional information about a particular certified electronic entity. In FIG. 9, screen shot 900 shows the user is shown as deciding to select "Company ABC." In doing so, FIG. 9 shows an electronic display on electronic application 702 that shows additional icons with additional information. In alternate embodiments, rather than showing icons, electronic application 702 may display all the information about "Company ABC." In FIG. 9, electronically selectable icon Goods/Services 710 allows for John to view additional information about products provided by Company ABC. Furthermore, electronically selectable icon Reviews 712 allows for John to view additional information about reviews by previous users who have electronically transacted with Company ABC. Electronically selectable icon Add Reviews 714 allows for John to add reviews about Company ABC once an electronic transaction/communication has occurred with Company ABC. In embodiments, Add Reviews 714 may include two electronic communication processes—the first including comments before the electronic transaction, and, second, including comments after the electronic transactions. Accordingly, this may allow for an electronic timeline that electronically displays in real time how a user electronically interacted with a company from start to finish of the electronic transaction. In embodiments, electronic comments before the electronic transaction may have a different score, for purposes of determining electronic certification, than a core associated with electronic comments that occur after the electronic transaction. Electronically selectable icon Sub-Entities 716 allows for John to select non-certified electronic entities associated with Company ABC. And, electronically selectable icon Certifications 718 allows for John to find out which electronic entity has certified Company ABC. In embodiments, processes 708-714 may be icons, images, and/or hyperlinks.

Figure 10:
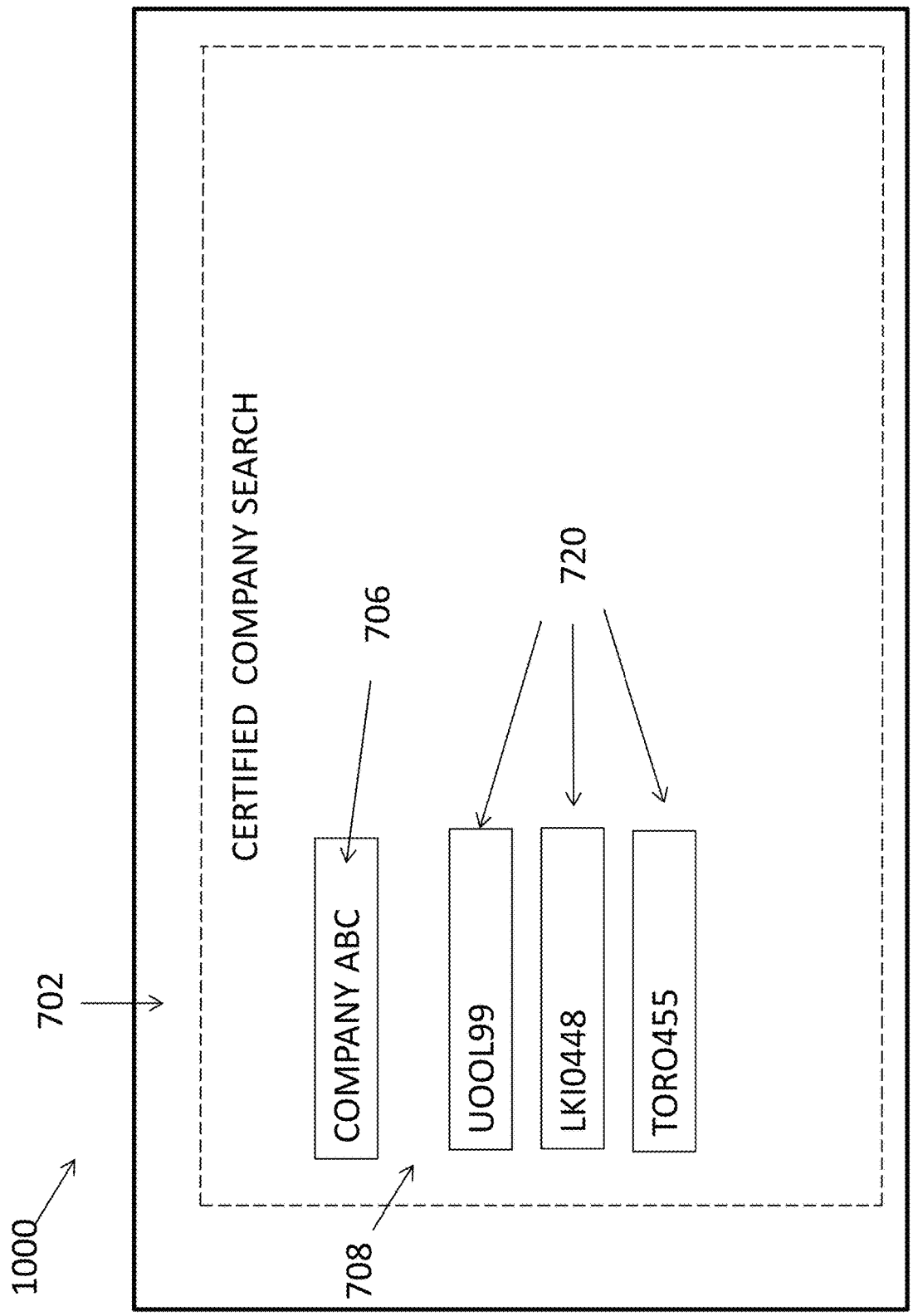

John decides to select icon Sub-Entities 716. As shown in FIG. 10, screen shot 1000 shows sub-entities 722 are shown on the electronic display. In embodiments, each sub-entity is an electronic entity that is associated with a certified electronic entity (Company ABC in this example). In embodiments, each sub-entity does not obtain electronic certification from the authentication server 120 based on a request from a third-party electronic entity. Instead, in embodiments, each sub-entity is authenticated by the certified electronic entity independently or based on previous electronic transactions. In embodiments, the certified electronic entity may use authentication server 120 to certify a sub-entity. In embodiments, the sub-entity may also provide products or services that can be sold by initiating electronic communications and electronic transactions on FIG. 10.

Figure 11:
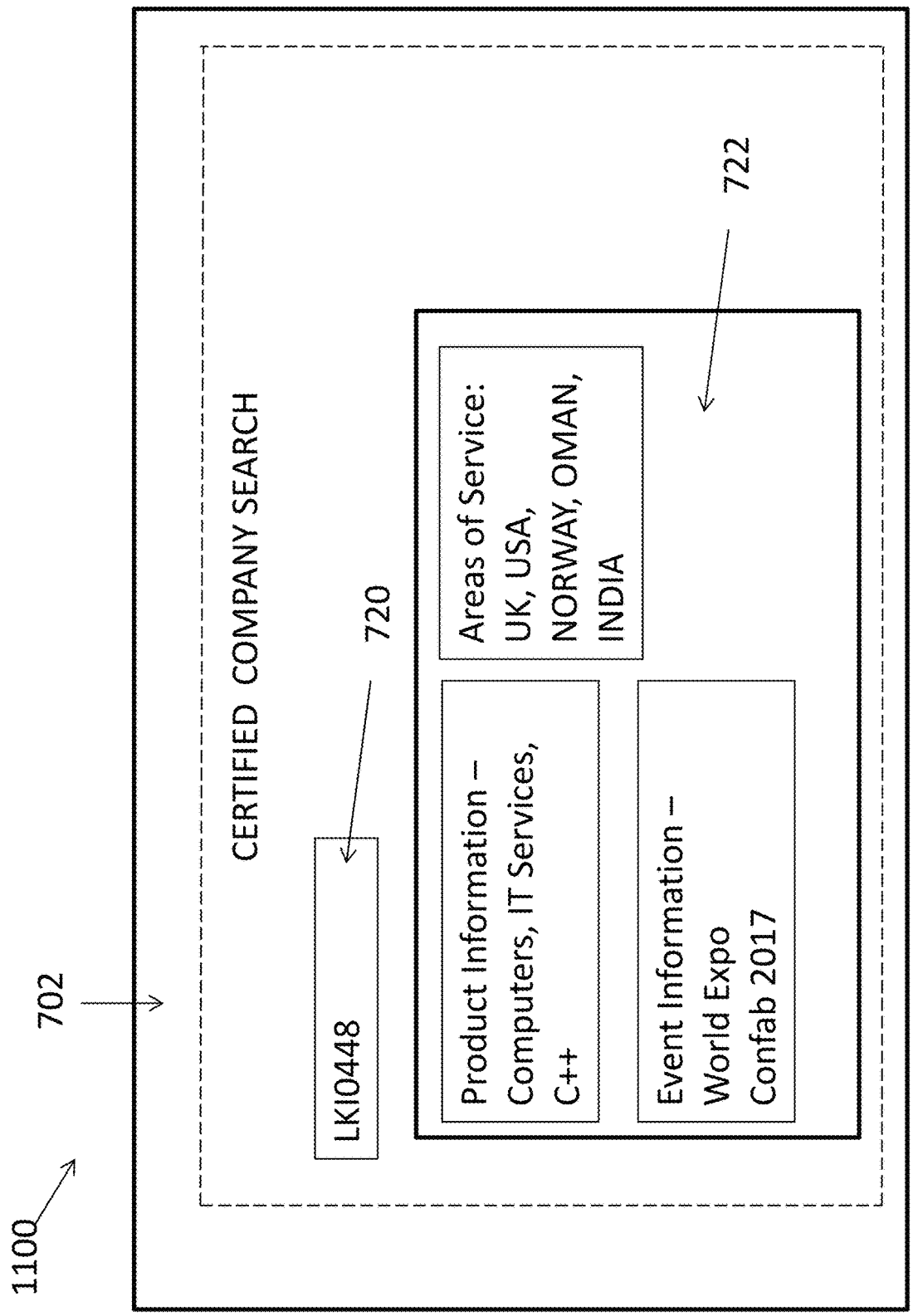

John decides to find additional information LKI0448. By selecting the icon for LKI0048, John is then shown an electronic display, in FIG. 11, which electronically displays additional information about LKI0048. As shown in FIG. 11, screen shot 1100 shows electronic application 702 shows product information from LKI0048, areas of geographic service (e.g., where LKI0048 ships products to), and event information. In embodiments, the product information may also include pricing information and that pricing information may change in real-time while the user is using electronic application 702. Thus, the user may be provided with the best price of the product and/or service being offered by a particular sub-entity.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While various actions are described as selecting, displaying, transferring, sending, receiving, generating, notifying, and storing, it will be understood that these example actions are occurring within an electronic computing and/or electronic networking environment and may require one or more computing devices, as described in FIG. 2, to complete such actions. Furthermore, it will be understood that these various actions can be performed by using a touch screen on a computing device (e.g., touching an icon, swiping a bar or icon), using a keyboard, a mouse, or any other process for electronically selecting an option displayed on a display screen to electronically communicate with other computing devices as described in FIG. 2. Also it will be understood that any of the various actions can result in any type of electronic information to be displayed in real-time and/or simultaneously on multiple user devices (e.g., user device 112, 114, and/or 116).

It should also be understood that electronic communications between electronic application 118 and other applications and/or servers may include the electronic transfer of electronic tokens may result in (i) the change of a value stored in a computing device, server and/or database based on one or more electronic communications, and/or (ii) the change in the amount of memory storage of electronic bits in a computing device, server and/or database based on one or more electronic communications. While electronic communications between different servers, computing devices, and application 118 may occur within an electronic environment, some electronic communications may be associated with non-electronic communications. For example, an entity (e.g., company or person) may not be an electronic entity and may request authentication information via paper mail, fax, etc. In embodiments, the authentication may be done by the authentication server, but the information may be sent electronically or physically e.g. via mail. In embodiments, once the authentication is done, an electronic certificate may be viewed on a computing devices after being transferred electronically, and/or consumers may view a physical certificate in a physical non-electronic store without using a computing device.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An electronic communications method, comprising:
   receiving, by a device, an electronic communication;
   analyzing, by the device, the electronic communication;
   generating, by the device, one or electronic authentication certificates, wherein each electronic authentication certificate includes graphical features that are displayed on a graphical user interface; and
   sending a second electronic communication to a second device that indicates that a first electronic authentication certificate is generated for a particular electronic entity, wherein the second device displays, via an electronic display, the first electronic authentication certificate;
   re-certifying, by the device, the first electronic authentication certificate based on new electronic information, wherein:
      the re-certifying the first electronic authentication certificate includes additional electronic communications from other computing devices and is based on continuous electronic transaction information based the additional electronic communications, and
      the re-certifying the electronic authentication certificate generates an indication of an event for the first electronic authentication certificate for display on the second device;
   receiving additional electronic information for a different electronic entity to generate a second electronic authentication certificate for the different electronic entity;
   determining, by the device, the different electronic entity consists of multiple sub-entities, wherein the multiple sub-entities include a first sub-entity and a second sub-entity;
   analyzing the additional electronic information;
   certifying a portion of the multiple sub-entities based on analyzing the additional electronic information, wherein:
      a first sub-entity has a first level of certification that is based on analyzing first electronic information about the existence of the first sub-entity and a geographic location of the first sub-entity, and
      a second sub-entity has a second level of certification that is based on the second sub-entity having positive reviews in addition to a quantity of complaints below a particular threshold, no information on past lawsuits, and confirmation of the second sub-entity's identity and geographic location,
      wherein, analyzing the first and the second levels of certification is done in real-time do determine that the first level of certification is the lowest level of certification and the second level of certification is the highest level of certification; and
   sending another electronic communication that the multiple sub-entities are certified, wherein the another electronic communication generates an indication of an event for the second electronic authentication certificate for display on the second device.

2. The electronic communications method of claim 1, further comprising:
   receiving, by the device, a request for electronic information about certified electronic entities;
   determining that there are certified electronic entities; and
   sending a third electronic communication that indicates the certified electronic entities; and
   electronically communication electronic tokens associated with the certified electronic entities.

3. The electronic communications method of claim 2, where the certified electronic entities have been certified based on a score that is below a threshold level, and where the score is based on the certified electronic entities being associated with a single geographic location.

4. The electronic communications method of claim 2, where the certified electronic entities have been certified based on a score that is above a threshold level, and where the score is based on the certified electronic entities being associated with multiple geographic locations.

5. The electronic communications method of claim 1, where the first electronic authentication certificate is generated by analyzing an electronic entity's previous electronic transactions and determining a percentage of the previous electronic transactions that are above or below a threshold percentage level.

6. The electronic communications method of claim 1, where the first electronic authentication certificate is electronically displayable as a hyperlink on an electronic application.

7. The electronic communications method of claim 1, where the device further displays non-certified electronic entities that are associated with the particular electronic entity.

8. The electronic communications method of claim 1, further comprising:
   analyzing, by the device, additional electronic information in real time; and
   not re-certifying, by the device, the first electronic authentication certificate.

9. The electronic communications method of claim 1, where the first electronic authentication certificate is associated with a physical building, and further comprising:
   generating another authentication certificate for a second entity, where the second entity is not associated with a physical building, where the other authentication certificate is different than the first electronic authentication certificate.

10. The electronic communications method of claim 9, where the analyzing the additional electronic information in real time further comprises:
   analyzing, by the device, real-time pricing information, analyzing, by the device, real-time product information, and where the re-certifying the first electronic authentication certificate further comprises:

re-certifying, by the device, the first electronic authentication certificate based on analyzing the real-time pricing information and the real-time product information.

11. The electronic communications method of claim 1, where the first electronic authentication certificate is only valid for a segment time.

12. The electronic communications method of claim 1, where the electronic information includes:
   review information,
   on-time shipping statistics, and
   number of employees.

13. The electronic communications method of claim 4, where the score is based on product information, wherein the product information includes type of product and availability of product.

14. A device, comprising:
   a processor, to:
      receive electronic information;
      analyze the electronic information;
      assign a score based on the analysis of the electronic information;
      compare the score to a threshold value; and
      authenticate an electronic entity based on comparing the score to the threshold value;
   generate an electronic authentication certificate based on the authentication of the electronic entity, wherein the electronic authentication certificate includes graphical features that are displayed on a graphical user interface;
   receive additional electronic information for a different electronic entity to generate a second electronic authentication certificate for the different electronic entity;
   determine the different electronic entity consists of multiple sub-entities, wherein the multiple sub-entities include a first sub-entity and a second sub-entity;
   analyze the additional electronic information;
   certify some of the multiple sub-entities based on analyzing the additional electronic information, wherein:
      the certifying the some of the multiple sub-entities includes additional electronic communications from other computing devices,
      the certifying the some of the multiple sub-entities is based on continuous electronic transaction information based on new electronic communications, and
      the certifying some of the multiple sub-entities includes generating a second electronic authentication certificate for the different electronic entity, and
   wherein the certifying:
      is based on reaching a particular threshold value, and
      is not based on comparing different sub-entities to other sub-entities in a ranking; wherein:
         the first sub-entity has a first level of certification that is based on a particular number of geographic locations of the first sub-entity,
         the second sub-entity has a second level of certification that is based on the second sub-entity having positive reviews in addition to a quantity of complaints below a particular threshold, no information on past lawsuits, and confirmation of the second sub-entity's identity and geographic location,
      wherein, analyzing the first and the second levels of certification is done in real-time to determine that the first level of certification is the lowest level of certification; and
   send another electronic communication that the multiple sub-entities are certified to a second device, wherein the another electronic communication generates an indication of an event for the second electronic authentication certificate for display on the second device.

15. The device of claim 14, wherein the processor is further to:
   receive different electronic information;
   analyze the different electronic information;
   generate another score based on the different electronic information, where the other score being different than the score.

16. The device of claim 15, where a first electronic token is associated with the electronic entity and a second electronic token is associated with the additional electronic entity.

17. The device of claim 16, where the first electronic certificate is valid for a particular period of time and additional validation includes additional analysis of new electronic information associated with the electronic entity.

18. The electronic communications method of claim 1, wherein the second level of certification is further based on certifying employees and the ages of the employees as well as the legal residency of the employees.

19. The electronic communications method of claim 1, further comprising:
   generating, by the computing device, the first electronic authentication certificate based on the certifying; and
   displaying, by the computing device, the first electronic authentication certificate.

20. The electronic communication method of claim 1, wherein the certification is associated with a quick response (QR) code, and price and product information associated with a first sub-entity is updated in real-time automatically updated, wherein the updated price and product information recertifies the first sub-entity or does not recertify the first sub-entity.

* * * * *